(12) United States Patent
Davis (10) Patent No.: US 8,435,037 B1
(45) Date of Patent: *May 7, 2013

(54) CHILD TESTING APPARATUS, INFORMATION SYSTEM AND METHOD OF USE

(76) Inventor: Tina Marie Davis, Laguna Beach, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 12/979,905

(22) Filed: Dec. 28, 2010

Related U.S. Application Data (63) Continuation-in-part of application No. 11/598,432, filed on Nov. 13, 2006, now Pat. No. 7,857,624.

(51) Int. Cl.
*G09B 19/22* (2006.01)
*G09B 19/00* (2006.01)

(52) U.S. Cl.
USPC ........... 434/128; 434/136; 434/256; 434/259; 434/339; 446/1; 273/236; 273/238; 273/241; 273/156

(58) Field of Classification Search ............... 434/128, 434/136, 258, 259, 339; 446/1; 273/236, 273/238, 241, 156
See application file for complete search history.

*Primary Examiner* — Kang Hu
(74) *Attorney, Agent, or Firm* — Patent Law & Venture Group; Gene Scott (57) ABSTRACT

A learning system for testing aspects of how a child learns includes a toy-like electro-mechanical chassis having upstanding pegs. The child is encouraged to place donut shaped hand pieces onto the pegs. The hand pieces test the ability of the child to discriminate between different colors, and separately between different textures and different shapes and also tests the child's abilities in perception and creativity. The electro-mechanical chassis also is able to test the child's ability to discern and copy tones and rhythms. Information of the child's performance is automatically collected and compared with normalized results of a large tested group of subjects. Remediation focuses on activities related to the learning channels where the child is least astute and periodic retesting measures the ability of the child to improve in those channels to enable improvement of remediation approaches.

4 Claims, 5 Drawing Sheets

FIG. 7

CHILD TESTING APPARATUS, INFORMATION SYSTEM AND METHOD OF USE

CROSS-REFERENCE TO RELATED APPLICATIONS

This application is a Continuation-In-Part of U.S. application Ser. No. 11/598,432 filed on Nov. 13, 2006 and issued as U.S. Pat. No. 7,857,624 on Dec. 28, 2010 and which is incorporated herein by reference in its entirety.

BACKGROUND

This disclosure relates generally to devices and methods for developing age-appropriate learning skills using customized programs for assessing the learning skills of children (subjects) using toy-like testing devices. A number of adult studies dating back to the 1920's indicate that adults have several learning channels which may be considered discrete and relatively independent from each other. Sounds, letters, shapes, designs, rhythm, and non-associative memory are the most easily identifiable of these channels and have the longest history of being formally measured. Hearing and sight are two channels most commonly used by adults and that schools, and the business community tend to pay attention to. Each of the channels involves a different portion of the brain and, for adults, they are relatively fixed. That is, if a particular channel is strong, meaning it is easy for the person to learn through that channel, or another is relatively weak then this will change little over time, even with concerted effort to make changes. However, for any learning situation, the more channels a person uses, the easier learning will be and the more information will be retained. It is clearly an admirable objective to maximize the number of channels used and their strengths. In practice, most adults have one or two relatively strong channels and the rest are not nearly as strong. Stronger channels tend to be favored leading to positive reinforcement during a person's lifetime.

Parents tend to unconsciously reinforce their child's learning through the same channels that they favor. This may not coincide with the child's naturally preferred channels. While educational toys for children are plentiful, none enable a parent to understand how their child learns in a truly comprehensive and unbiased manner. Research and observation by the inventors of the present apparatus and method suggests that children between the ages of about three to four years may be at a uniquely flexible point in development. That is to say, that they may be able to increase the beneficial utilization of all of their learning channels.

SUMMARY

Given consistent findings in published adult studies, the inventors started with the hypothesis that, if learning channels could be measured in preschool children, the results would also show that a child between the ages of two and six years old would show differences in the relative strengths of their learning channels. If this could be demonstrated, it was additionally hypothesized, that because neural development is not complete in this age group, it might be possible to create conditions under which a relatively weak learning channel could be strengthened. The literature suggests that young children learn from color, shape, texture, sounds, rhythms, two dimensional designs, and three dimensional shapes. In addition, children obviously also learn by observation and their experiences. Our literature search failed to identify a single study that shows how to deal with separate learning channels so as to measure channel strength in children under five.

A program providing assessment and customized targeting of learning channels provides parents an opportunity to broaden their children's channels, and as such, gives a competitive advantage for the child to be better prepared for an increasingly overloaded and demanding educational environment. One embodiment of the invention provides a method for parents to interact with their children to better understand how their child learns. To the child, a toy used by the parent and designed for assessing isolated learning channels may be perceived as playing a game. During this "play" activity the data representing responses by the child to the game situation are captured electronically and recorded on a memory chip. After the game is finished, in one embodiment, the parent provides the collected data to a secure interactive web-electro-mechanical portal and receives detailed information on each learning channel. This service includes recommended feedback on how to improve and build on the learning channel development of the child. In other embodiments, feedback may be produced through non-web-electro-mechanical systems and software or built into the toy device itself.

The problem with existing commercial learning toys is that they use more than one learning channel simultaneously making it impossible to gain an objective measure of what is observed. The inventors therefore designed several toys that would isolate learning channels. Starting with a simple stacking toy, different sets of disks were designed for each of three learning channels: color, shape and texture. In addition, the inventors designed several games that would isolate tonal, rhythm, 2-dimensional and 3-dimensional learning. The inventors arranged for subjects for a preliminary study of learning channels. About 65 preschool children, age 3-5, took part in the study. Parents were not told anything about the study or its purpose except that it was about development in children. A standard procedure and process was developed that allowed the consistent observation of learning channels with each child. The following describes results found through observation.

Individual children showed differences in how easily and well they accomplished tasks that isolated individual learning channels. For instance, a child might easily accomplish a task that focused on color, but have more difficulty accomplishing a task that focused on sound.

It was possible to score each child's responses on each task in an objective and replicable way, using a simple 1-5 scale. The scale represents years of age for the child. Thus, the scales were created in such a way that the normal development of a 3 year old would result in a score of 3 on a task. If a child of 3 scores 1 on a task, then this means that it is a relatively weak learning channel for that child. Likewise, if a child of 3 scores a 4 or 5 on a task, this means that it is a relatively strong learning channel for that child. Using these scores, it was possible to create a learning profile for each child observed.

In certain cases, it was possible, after one or two unsuccessful trials with a learning task, to point the child's attention to a critical aspect of the toy. With some, although not all of the children with whom this was attempted, the child showed marked improvement on the learning channel task. A child of four years might go from scoring consistently at a level of '1' on a task to a '4' level for instance. We were not able to perform repeat testing on the children for these trials, but a subject for future research will be whether this kind of improvement in a child's conditioning is more or less permanent or not. The fact that this marked improvement was observed, at all, in any of the children, is in stark contrast to what is observed with adults.

The first task in measuring the relative strength of learning channels is to isolate the different learning channels. The procedure for isolating the learning channels in children age 3-5 preferably takes into account the child's presumed level of familiarity with different types of tasks. For example, one cannot presume that children this age can read or are familiar with letters. We therefore want to use a basic task that will be familiar to children of this age and that most children of this age group can physically perform. We chose a basic task that almost all preschool children of almost all cultures are in some way familiar with: stacking toys. The normal stacking toy consists of one or more pegs fixed to a electro-mechanical chassis, with several pieces designed to fit onto the pegs so that the pieces can be easily stacked and held in place for an interval of time. Stacking toys are designed for children to sort the pieces—typically according to color, size or shape, and their are more imaginative toys designed for the children to sort other dimensions as well. Typically, a stacking toy employs several learning channels at the same time, e.g., color and shape and size—in order to increase the likelihood that the child will see one of these channels and sort according to it. The present invention is configured to isolate learning channels. The toy employs multiple sets of disks to stack and sort on multiple pegs. In one specific embodiment, the toy employs three sets of disks and five pegs. Other embodiments, employ variants on this, and some embodiments have a sound-generating chip to observe the tonal and rhythm learning channels. The three sets of disks are designed so that the only way to sort them will be to use one, and only one learning channel. One set of disks sorts by color, a second by shape, and a third by texture. The tonal and rhythm chip may be designed to produce a tone or a set of tones in a rhythmic sequence. The child will match the tone or match the rhythmic sequence.

In one embodiment, to use the toy, the parent lays out the disks and stacking pegs for a particular learning channel—color, for instance. Saying as little as possible about the task, the parent will ask, "Where do the disks go?" He or she will let the child put the disks on the pegs wherever the child wants to put them. The toy is made with a tracking device that identifies each disk and records on which peg and in what position the child puts each disk When the child is finished, the parent will lay out the pieces again and ask the same question: "Where do the disks go?" The child will again work with the pieces. If the child is close to being able to do the task, but still has not been able to fully assemble the pieces, the parent may lay out the pieces again and again letting the child put the pieces on the pegs. If the child is not close to being able to do the task the parent may end the observation with the second trial. The parent may make observations for color, texture and shape with the appropriate sets of disks. The parent may then make observations for tone and rhythm using the sound chip. This may be automated so that the parent will press a button to start the trial and the child will press one of several buttons in order to match the tone. In the same way, the parent may press another button in order to produce a rhythm. The child will imitate the rhythm, using a key in the toy. In one embodiment, once the parent has orchestrated two or three trials for each of the learning channels, he or she may upload the data generated by the trials to a website.

Using a set of algorithms acting on the test data, a set of descriptions of the different learning channels for the child are produced. The parent is therefore informed as to the strongest and weakest channels. In some embodiments, the parent may be able to download some suggestions for play and observation for the individual child. The parent may be able to use these suggestions for play with the child in order to strengthen weak learning channels and to help the child integrate all of the learning channels in play. In other embodiments, the parent's observations may be entered into non-web-electro-mechanical systems with software on a computer or even entered into the toy itself which then produces the individualized results. Ideally, the parent should observe the child with the toy about every three months from about the child's third birthday until he or she turns five. Other frequencies and age ranges may be used, depending upon the individual child's developmental status. The underlying logic of the website may keep track of the data for each child. This data will be used to track the progress of each child as he or she grows older. This data may be used to update the data on which the results for each child are collected and which the algorithms are used to pull descriptions and suggestions for the parent. In addition, it is anticipated that this data will be used to write studies on children's learning channels for scientific publication. The website or software may also be used or programmed to aggregate the results of two or more children to report group results. One particular embodiment of the invention comprises a toy and instructions that are designed to make the mostly invisible process of learning in children highly visible and obvious to the parent. This particular age is a time of very rapid cognitive development, and children change very quickly throughout these two years.

A primary objective inherent in the above described apparatus and method of use is to provide advantages not taught by the prior art.

Another objective is to provide a physical apparatus capable of testing a child's learning ability in discrete learning channels.

A further objective is to provide an information system capable of measuring the child's performance in each of the channels against a standardized scale.

A further objective is to utilize such measurements to assist in determining steps for improving learning skills in weak channels.

A further objective is to provide a method for testing learning skills in children.

A further objective is to provide such a method capable of isolating the testing of learning skills according to well known channels.

Other features and advantages of the present invention will become apparent from the following more detailed description, taken in conjunction with the accompanying drawings, which illustrate, by way of example, the principles of the presently described apparatus and method of its use.

DESCRIPTION

Figure 1:
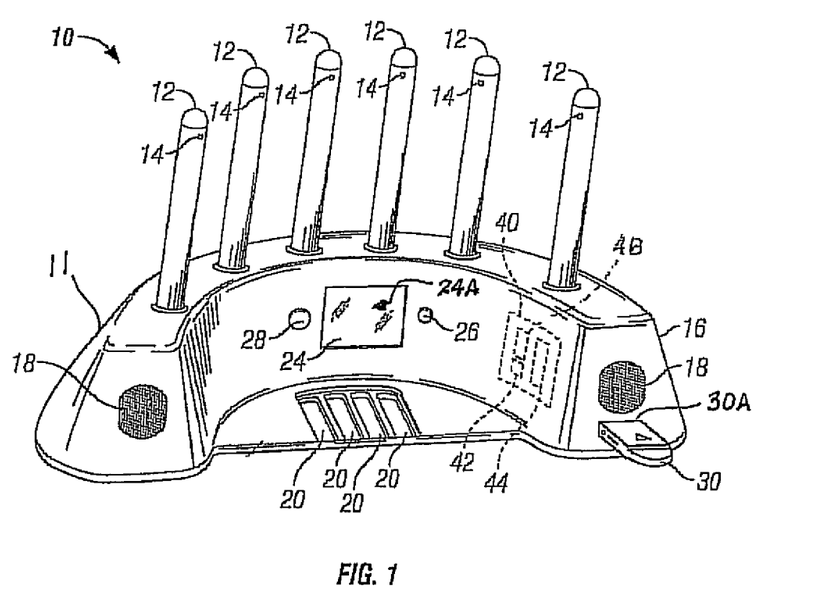
FIG. 1 is a perspective view of a electro-mechanical chassis unit of the presently described invention.
Figure 2:
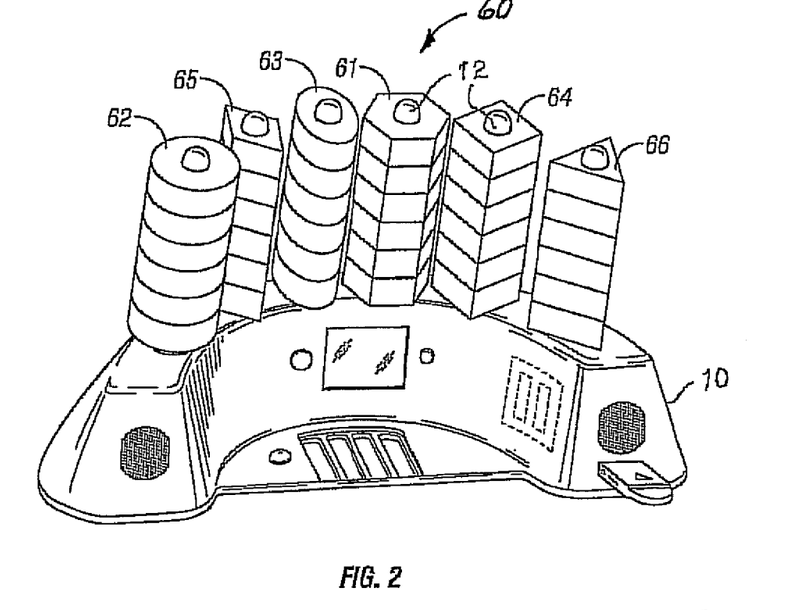
FIG. 2 is a perspective view thereof showing stacked hand pieces engaged with upright pegs of the electro-mechanical chassis.

Disclosed now is a learning system providing an electromechanical chassis 10, having an enclosure 11 with an interior space as shown in FIGS. 1 and 2. A plurality of receivers 12 may extend in mutual vertical alignment from the enclosure and each may have a proximity sensor 14 with a unique sensor identity. In the preferred embodiment shown in FIG. 1, the receivers 12 may be upright pegs, but may also be another device such as apertures that are able to accept objects inserted therein, or other alternative devices where two elements are joined or brought together. The proximity sensors 14 are preferably optical scanners, but may also be magnetic, RFID, or any other type of sensory instrumentation, and these sensors 14 are positioned on the receivers so as to detect when a hand piece 60 is engaged with the any one of the receivers 12 as will be explained below.

Figure 3:
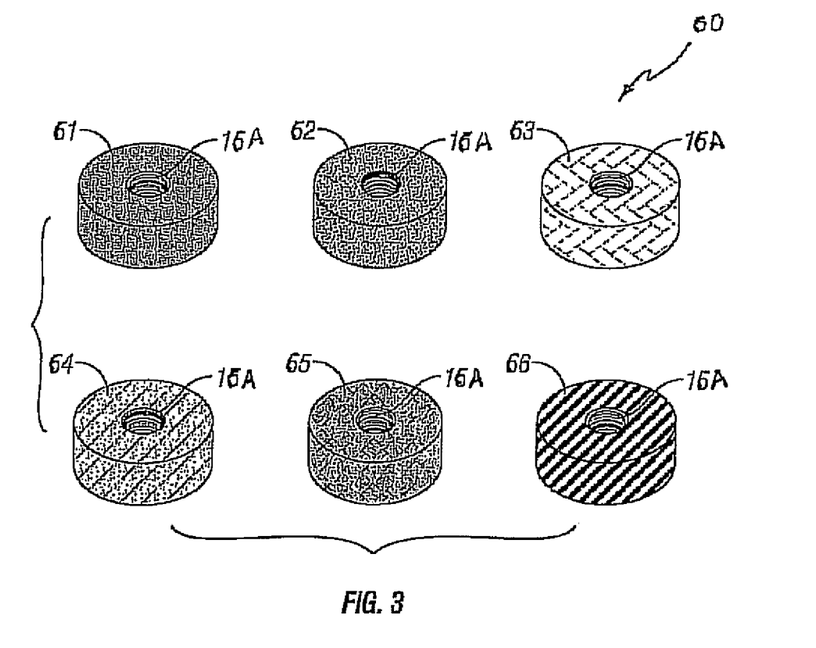
FIG. 3 is a perspective view thereof of one configuration of the hand pieces distinguished by their surface texture for tactile discrimination or by their color for visual discrimination.
Figure 4:
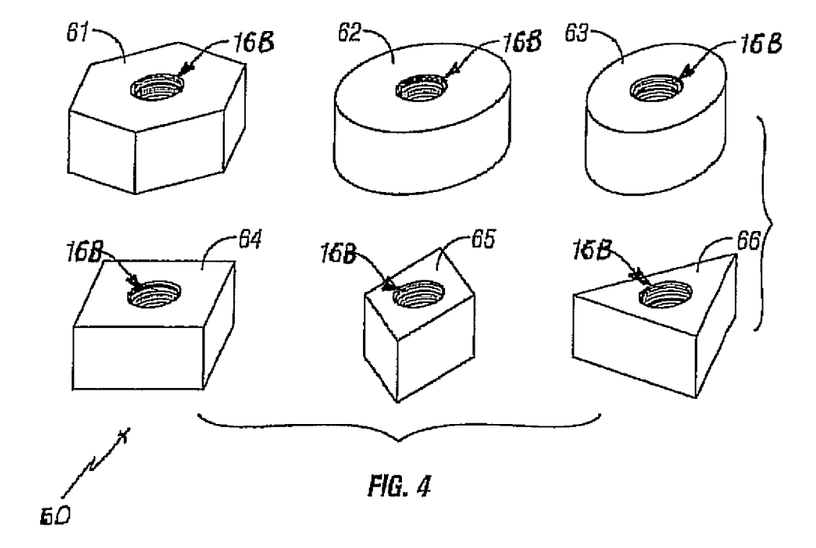
FIG. 4 is a perspective view thereof of another configuration of the hand pieces distinguished by their shape for visual discrimination.

A plurality of the mutually distinguishable hand pieces 60 each may be a block with a hole 16A as shown in FIG. 3. Holes 16A are large enough for the receivers 12 to enter allowing the hand pieces 60 to slide downwardly along the receivers 12 until contacting a top surface of the enclosure 11 or an earlier placed one of the hand pieces 60. A unique identity feature 16B as shown in FIG. 4, is capable of being sensed by any one of the proximity sensors 14 when the hand piece 60 is engaged with a respective receiver 12. The identity features 16B may be bar codes printed on inside surfaces of the holes 16A of the hand pieces 60 as shown in FIG. 4, and, of course, each bar code is different so as to provide a unique identity to each hand piece 60. In an alternate embodiment, the proximity sensor 14 may be a magnetic switch and the identity feature may be a magnet or magnetic coating on the inside of the holes 16A. Each of the hand pieces 60 may have three ring magnets, each positioned with its north N and south S magnetic poles in a selected orientation so that the number of unique arrangements is two to the third power wherein eight arrangements are possible, and this suffices for a receiver 12 that will accept up to eight hand pieces 60. For instance, a particular hand piece 60 might produce the sequence of: N-S, S-N, N-S when placed onto a receiver 12.

The receivers 12 may be hollow so that a sensor 14 is easily mounted therein. Each sensor is adapted, as known in the art, to identify itself within an electrical circuit so that the identity of each hand piece 60 on each receiver 12 may be recorded during use of the learning system.

In the presently described embodiment, the hand pieces 60 are organized into three sets of hand pieces 60 each having 36 pieces 60. Each set is designed to evoke a different learning channel, and determine the current skill level when dealing with that channel by a child which is the subject of the learning system and the data taken and recorded.

The learning channels are: color, shape, texture, tone and rhythm. FIG. 3 graphically represents six color variations shown by cross-hatching which represents different colors, and there are six hand pieces 60 of each color for a total of 36 color related hand pieces in the color set. FIG. 3 also graphically represents six surface texture variations and there are six hand pieces 60 of each texture for a total of 36 texture related hand pieces in the texture set. FIG. 4 represents a shape variation set of the hand pieces 60 and there are six of each shape for a total of 36 shape related hand pieces. FIG. 2 shows the entire shape set of the hand pieces 60 as mounted on receivers 12.

Clearly, the particular colors, textures and shapes may be selected from a wide range of possibilities but in each set, the differences between the colors, the textures and the shapes are selected to be dramatic so the subject has little difficulty in distinguishing one from another. The full set, in the present embodiment includes six identical hand pieces of each of the six different colors, textures and shapes, so that the leaning system has a total of 108 hand pieces 60.

An electronic circuit 40 housed within enclosure 11 enables the leaning system to function as will be described below. The circuit 40 includes circuit elements which are mutually engaged as would be known by a skilled electrical engineer and include an information processor or computer 42 with a memory device 44 which may be a solid state digital memory, and the sensors 14, speakers 18, Circuit 40 collects and stores data within memory 44 defining the physical relationships between the hand pieces 60 and the receivers 12 as the pieces 20 are placed on the receivers 12. The order and placement of the hand pieces 60 are critical to the determination of the proficiency of the subject within each learning channel. If hand pieces 60 are placed and later removed and/or replaced onto the same or different receivers 12 these actions are also recorded and are deterministic in forming conclusions about the subject's proficiency.

Figure 6:
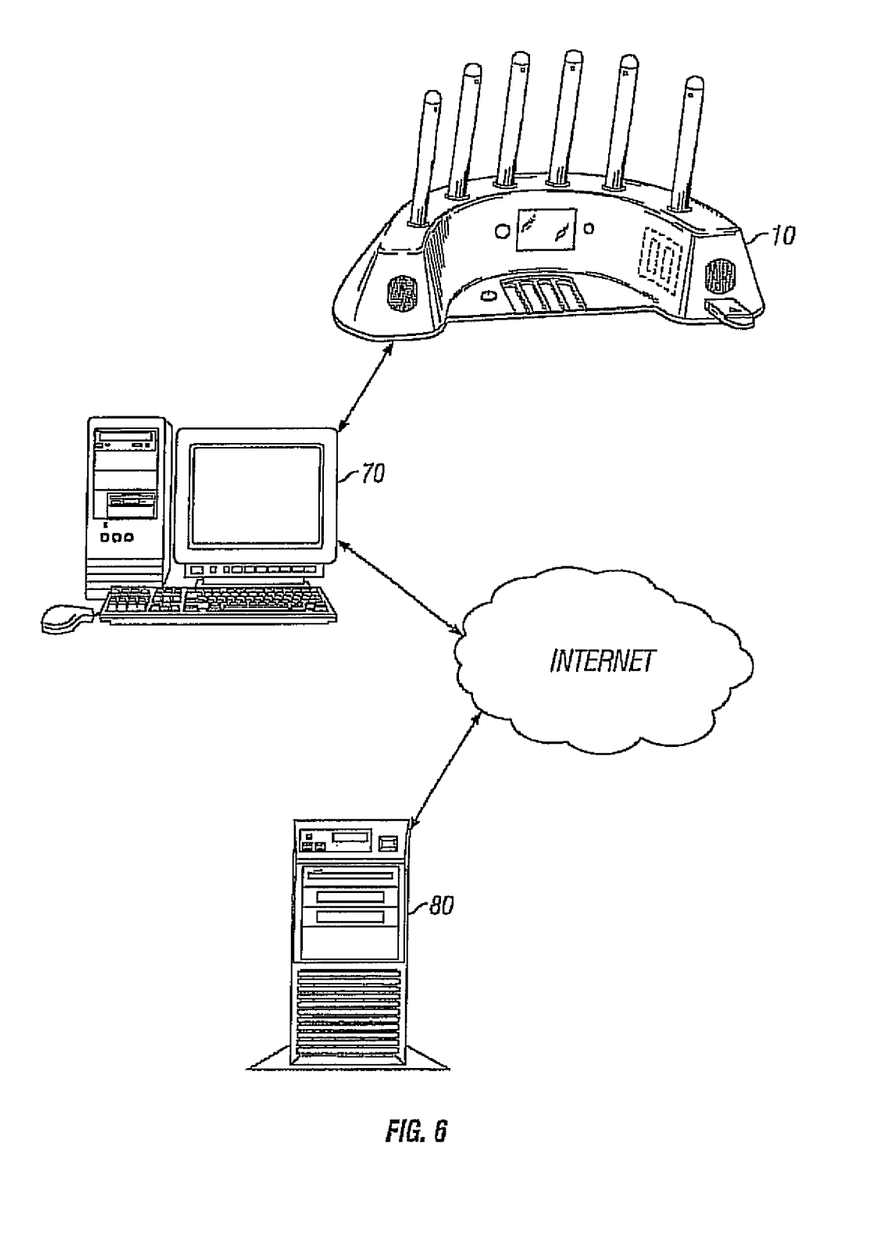
FIG. 6 is an information system configuration schematic showing information flow between several information processors of the present invention.

Beside the three hand piece sets, circuit 40 provides four touch sensors 20, which are able to produce four distinct tones through a tone generator 46 or rhythms through a rhythms producing electric circuit stage of circuit 40 and these tones and rhythms may be produced and heard via the loud speakers 18. Clearly, more than four such sensors 20 may be used for a greater number of tones and any number or rhythms may be incorporated in circuit 40. The circuit 40 includes a display device 24 such as an LCD screen, a mode learning channel switch 28 for moving from one learning channel to another, and a go/no-go lamp 26. This lamp 26 provides green illumination for go or continue testing, and red illumination for stop testing. An algorithm stored in memory device 44 is programmed to determine when results of a test in a currently tested channel is sufficient or insufficient to make a determination of the child's current ability. Testing will continue until fixed sufficiency parameters are met or until a selected number of repeated testing cycles have been completed. A data communicator such as a removable solid state memory 30 may be inserted into a port 30A in the enclosure 11, the port preferably a USB type or similar connector socket. The leaning system 10 may be wire or wirelessly linked to a computer server 70, or 80, as shown in FIG. 6, for analysis of data taken by the learning system 10, and also linked to a television or computer monitor substituted for the smaller screen 24 of the learning system 10.

The above described apparatus is used in a novel method for identifying learning channel preferences and proficiencies of a child. The method includes the step of producing a learning channel specific stimulus having selective variability comprehensible to the child. The specific stimulus in the present invention is one of color, shape, surface texture, tone and rhythm. As stated above, these five stimuli represent five distinct and separate channels used by the child in learning. Each is tested independently so that, for instance, the color or the texture hand pieces 60 do not have different shapes. The hand pieces of differing shapes and textures all have the same color. Each stimulus is provided in isolation to the others.

The placement by the subject of the hand piece 60 for the color, texture and shape learning channels are automatically detected and this data is stored in data sets. In testing for tone, a testing facilitator enables a tone or rhythm to be generated using a remote hand held unit (not shown) with is in wireless communication with the learning system 10. The subject is then asked to press sensors 20 to reproduce the same tone or rhythm. If the subject fails, the test is repeated In this test, the value of the repetition variable may be of interest. This data is recorded and later made a part of the analysis.

The entire data set is compared with normalized distributions of data taken using identical procedures from a population of children of the same age group as the subject. Variances between normalized performance and that of the subject are determined to form score values defining proficiency within each of the learning channels.

Figure 5:
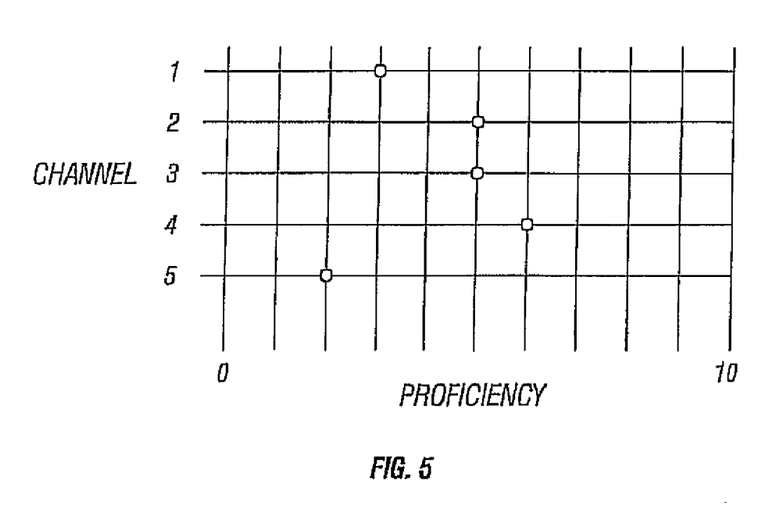
FIG. 5 is a proficiency chart showing results of testing within several learning channels provided by the apparatus while using the method of the present invention.

A responsive report quantitatively defining the learning channel preferences and proficiencies of the child and recommended remediation are provided to the subject's parent or guardian. FIG. 5 is a chart that indicates the proficiency of a typical subject in each of the five channels discussed. On a proficiency scale of 1 to 10 with 5 representing a normalized mean, the scores of the child are shown by small circles. In this case, we see scores of: 1-3, 2-5, 3-5, 4-6, and 5-2; wherein the first numeral represents the channel number and the second numeral represents the score on the 10 scale. Such a scale may represent standard deviations from the mean, or any other method of grading.

Our research has shown that the preferred channels for children between the ages of 36 months and 59 months are shape, color, texture, tone, and rhythm. However, other channels may be included within the human senses responsive to visual, tactile, audible, olfactory; and taste stimuli. Additional learning channels may be utilized for young children and others for slightly older children. Clearly, the materials used for testing and the types of thinking required by the child will differ according to age, but the principles of the present invention apply broadly to all classes of subjects, i.e., the techniques of observation and measurement of activities within isolated channels are similar to those described above.

The screen 24 or a television, computer or similar monitor may serve as a prompting device to motivate and direct the subject in "playing" with the learning system in a manner for expediting and improving data collection, that is, obtaining the objective information optimally. For instance, with the subject placed appropriately, i.e., preferably in a sitting posture facing the screen 24 of the learning system 10, the facilitator places the 36 loose pieces of one of the sets of the hand pieces 60 between the subject and the learning system 10 in such position whereby the subject is able to very easily reach each of the pieces 60 of the set and also reach the receivers 12. The facilitator then activates the system. The memory device 44 stores an audio-video program featuring an animated character or characters and an image of the learning system 10 and the hand pieces 60. The animated character appears on the monitor screen 24 and playfully engages the child to listen and follow it's lead in play. For instance, the animated character may say, "it's time to have some fun, lets play the color game;" or the name of which ever set of pieces 60 is in front of the subject. The animated character says, "see all the fun colors of the pieces? Let's place them on the toy. Let's play!" The animated character pretends to pick up the pieces and place them on receives 12 on screen demonstrating to the subject how to play. The learning system 10 tracks the locations of each hand piece 60 as it is placed, removed, replaced and so on, and records the sequence of placements and prompts the subject continuously to encourage play using motivational, and feel-good commentary. If excessive time passes without a hand piece 60 being moved, commentary includes greater motivational statements, if a lot of activity is sensed, the commentary includes a greater amount of feel-good commentary.

If all the pieces 60 are placed onto the receivers 12, the learning system 10 signals the facilitator to switch to another channel and continue as described above in a similar manner until all five channels are tested. During play, and immediately after each set of pieces have been mounted on the pegs, the animated character provides audio-visual reinforcement to the subject for doing a good job.

Figure 7:
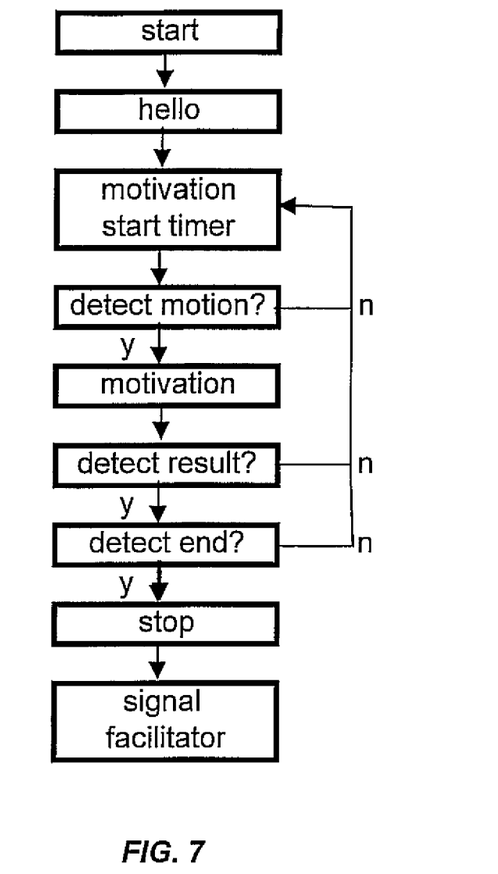
FIG. 7 is a program sequence diagram of a method of the present invention.

In a further embodiment of the present apparatus and method of use, a motion detection system is made a part of the circuit 40 and expands the effective use of the learning system 10. A camera 24A or other motion sensing device is placed behind the screen 24 or other centrally positioned location on enclosure 11. Such a motion sensing system may be incorporated as taught by Osnato et al, publication US 2007/0111779, or by Zhou Ye, publication US 2009/0104993, or Mitsuhiro Nomi et al, U.S. Pat. No. 7,070,500, all of which are incorporated herein by reference in their entirety to support the present disclosure in the use of motion sensing and its enablement for processing motion detection data and its significance relative to triggering or activating aspects of the present learning system 10. FIG. 7 is a summary of an operational program stored in memory 40 and activated in the use and control of the present method by the facilitator. FIG. 7 represents an automated sequence that is started by the facilitator preferably using a remote control and repeated for each tested channel. After start is initiated, assuming color, texture or shape testing, the hand pieces 60 are placed in front of the subject by the facilitator and the animated character on screen greets the subject with a hello message as shown in FIG. 7, such as, "Hi, how are you? Are you ready to play with me? Okay, lets go." Next, the character presents a motivational message and starts a timer that is part of the circuit 42. This message may be something like, "Hey, look at the blocks, lets put the blocks on the pegs like this. The character demonstrates putting the hand pieces 60 on the receivers 12 in a generic manner so that the subject is not biased as to which piece 60 is placed on any particular receiver 12. Next, the subject's motion is checked by the motion detection circuit using optical detector 24A. If no motion is detected, the motivation sequence is repeated along with resetting the timer. As shown in FIG. 7, if motion is detected, the software sequence looks for a detection by one of the proximity sensors 14. If detection is does not occur prior to the timer ending, the sequence is repeated from the initial motivation with a reset of the timer. This sequence may be repeated by a preset selected number of times and a library of motivational statements are available and used in a random order so that the subject may be motivated by different statements. When a detection of a hand piece 60 on a receiver 12 occurs, the identity of the hand piece 60 and the receiver 12 are logged into memory 44. Next, the program tests for and end meaning that all of the hand pieces 60 have been placed on the learning system. If so, the channel test is halted and the facilitator is signaled. If an end is not detected, the program repeats from the initial motivation and resets the timer as shown in FIG. 7.

When the tones and rhythms are tested, the facilitator remotely triggers a tone using a remote control unit and the tone or rhythm is reproduced audibly from speakers 18. This triggers the "Start" of the program as depicted in FIG. 7. Next, the animated character speaks the motivational message and the timer is started. The character demonstrates pressing all of the sensors 20 on the screen 24 and asks the subject to find the one that is the same as the original tone or rhythm produced by the facilitator. Subject motion is detected or not and as with the above description a further motivation and timer restart is made when motion is not detected or just motivation if motion is detected. The result is detected and if it is not correct the sequence is repeated until the subject achieves a correct result or the timer completes it cycle. When this occurs the cycle may be repeated or ended by the facilitator. More than one tone and more than one rhythm are tested in the same manner and all data is recorded to memory.

A number of embodiments have been described. Nevertheless, it will be understood that various modifications may be made without departing from the spirit and scope of this disclosure. Accordingly, other embodiments are within the scope of the following claims.

What is claimed is:

1. A learning system apparatus comprising:
   a) a electro-mechanical chassis having an interior compartment;
   b) a plurality of upright peg receivers secured to the electro-mechanical chassis, each of the receivers providing a proximity sensor having a unique sensor identity;
   c) a plurality of mutually distinguishable hand pieces, each of the hand pieces having an aperture therethrough of such size as to receive any one of the upright peg receivers thereby securing the hand piece on the upright peg receiver, and each of said hand pieces further providing a unique hand piece identity feature within said aperture, said identity feature capable of being sensed by any one of the proximity sensors when the hand piece is engaged with the respective receiver;
   d) an information processor within the compartment; and
   e) a memory device within the compartment;
   the sensors, processor and memory device mutually engaged as a data processing circuit, enabled for storing a data defining relations between the hand pieces and the receivers.

2. The apparatus of claim 1 wherein the circuit further comprises a tone generator and a touch sensor, the tone generator enabled for generating a first tone upon receiving a touch on the touch sensor, followed by a second tone upon, receiving a further touch on the touch sensor; the apparatus enabled for storing relationship data respective of the first and second tones.

3. The apparatus of claim 1 wherein the circuit further comprises a tone generator and a touch sensor, the tone generator enabled for generating a first tone rhythm upon receiving a touch on the touch sensor, followed by a second tone rhythm upon receiving a further touch on the touch sensor, the apparatus enabled for storing relationship data respective of the first and second tone rhythms.

4. The apparatus of claim 1 wherein the proximity sensor is a bar code reader and the hand piece identity feature is a bar code indicia.

* * * * *